L. W. YOUNG.
Tubing-Tongs.
No. 219,338. Patented Sept. 2, 1879.
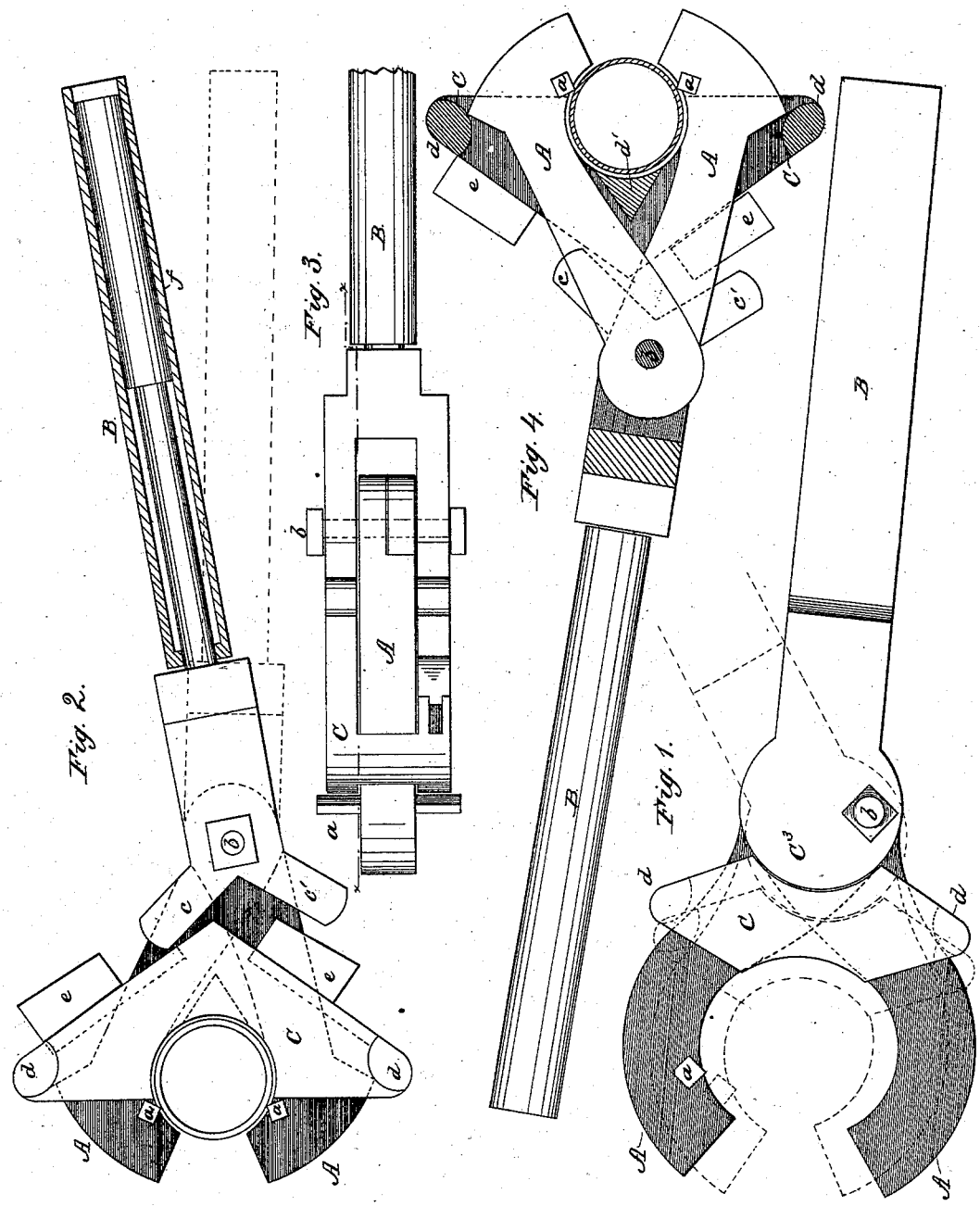
WITNESSES:
W. W. Hollingsworth
Edw. W. Byrn
INVENTOR:
L. W. Young
BY
ATTORNEYS.

UNITED STATES PATENT OFFICE.

LEMUEL W. YOUNG, OF ELK CITY, PENNSYLVANIA.

IMPROVEMENT IN TUBING-TONGS.

Specification forming part of Letters Patent No. 219,338, dated September 2, 1879; application filed January 27, 1879.

*To all whom it may concern:*

Be it known that I, LEMUEL W. YOUNG, of Elk City, in the county of Clarion and State of Pennsylvania, have invented a new and useful Improvement in Tubing-Tongs; and I do hereby declare that the following is a full, clear, and exact description of the same, reference being had to the accompanying drawings, forming part of this specification, in which—

Figure 1 is a plan view. Fig. 2 is a similar view of a modification of the form shown in Fig. 1, with an extension-handle, shown in section. Fig. 3 is an edge view of the device shown in Fig. 2. Fig. 4 is a sectional view of the same device through line $x$ $x$, Fig. 3.

My invention relates to a novel construction of tubing-tongs, designed more particularly for screwing and unscrewing the sections of tubing for oil-wells, but applicable to general use as pipe-tongs.

The invention consists in the combination of a pair of pivoted jaws, a yoke embracing said jaws, and a lever or handle pivoted to the same bolt which connects the jaws, and arranged when deflected to bear, by a cam or eccentric projection, upon the yoke, so as to force the same down and clamp the jaws upon the section of pipe, all as hereinafter more fully described.

In the drawings, A A represent the jaws, which conform upon their inner edges to the circular form of the tubing, and are provided with removable angular bits $a$, made of hardened steel, for causing the jaws to bite the tubing with a sufficient hold for turning the same. B is the oscillating lever, to which the jaws are pivoted at $b$. This lever is slotted at one end to receive the jaws. C is the sliding yoke, which is arranged to embrace the jaws, and is forced down upon the same to cause them to gripe the tubing by the deflection of the lever.

The projection of the yoke down upon the jaws, to cause the latter to gripe the tube, is, preferably, effected by an eccentric projection, $c^3$, which bears against a corresponding seat in the yoke, as shown in Fig. 1. There may, however, be two eccentric projections, $c$ $c^1$, as shown in Figs. 2 and 4, one being arranged upon each side of the pivotal connection of the jaws.

The yoke C is made of two plates, arranged upon opposite sides of the bars, and connected by bars $d$ $d$. When the handle with the single cam is used, the form of yoke shown in Fig. 1 will be employed; but when the handle with double eccentric projections is employed the yoke will preferably be made in triangular form, with a middle connecting-bar, $d'$. This cross-bar is made wedge-shaped in cross-section, (see Fig. 4,) and is arranged between the jaws, so that when the lever is pushed longitudinally forward it wedges apart the jaws and releases their gripe upon the tube.

In operating the tongs, the jaws are loosely placed around the tube and the lever thrown to one side. This action causes the eccentric projection to strike the rear edge of the yoke and force it down upon the jaws. As said yoke moves down, its concavity is applied to the tube, and the cross-bars $d$ $d$ force the jaws together, causing them to co-operate with the yoke in tightly seizing the tube. Now, when the tube is being connected or disconnected in vertical position, as in setting the tube into or removing it from the well, the lever is continuously moved around the tube in the same direction, to screw or unscrew the sections. When, however, the tongs are to be used for laying a pipe-line in a position approaching the horizontal, the lever has to be reciprocated.

In using the form shown in Figs. 2, 3, and 4, it will be seen that when one of the lugs $c$ of the fork is resting against the yoke the other one, $c^1$, is some distance removed from the yoke, and in working the lever back and forth in operating upon horizontal section this would cause too much lost motion. To provide for this difficulty I form in the inclined edges of the yoke a dovetail groove, and in the same I place upon each side a sliding metal block, $e$. Now, when $c$ is the working-lug of the lever, the block $e$ upon the opposite side is slipped up between the lug $c^1$ and the yoke, so that there will be less play. This block must not entirely take up the looseness, however, as some slack is required to allow the jaws to be released in the alternate movement.

Ordinarily, when working the tongs, a short handle to the lever will be preferred; but to provide for an increased amount of leverage, which is sometimes required, an extension-tube, *f*, Fig. 2, is arranged upon the handle of the lever, which may be slid out to increase the leverage, or pushed up for greater convenience when the extra leverage is no longer needed.

Having thus described my invention, what I claim as new is—

1. The tubing-tongs consisting of the combination of a pair of pivoted jaws, a yoke embracing said jaws, and a lever or handle pivoted to the same bolt which connects the jaws, and arranged, substantially as described, to force the yoke down and clamp the jaws by being turned upon its pivot, as set forth.

2. The pivoted jaws A A, the sliding yoke C, having cross-bars *d d*, arranged upon the outside of the jaws, and cross-bar *d'*, arranged between the jaws, together with the lever B, pivoted upon the same bolt with the jaws, all combined substantially as shown and described.

3. The combination, with the pivoted clamping-jaws, of a yoke embracing the same, and a lever or handle connected to said jaws, and arranged to force the yoke down upon the same by being deflected, substantially as described.

4. The combination, with the lever B, the pivoted jaws A, and the sliding yoke C, of an adjustable block, *e*, arranged to take up the lost motion between the yoke and the lever, substantially as described.

LEMUEL W. YOUNG.

Witnesses:
B. F. KECK,
SOLON C. KEMON.